June 25, 1968  E. S. L. BEALE  3,389,599
ENGINE-CYLINDER PRESSURE INDICATORS
Filed May 20, 1965  4 Sheets-Sheet 1
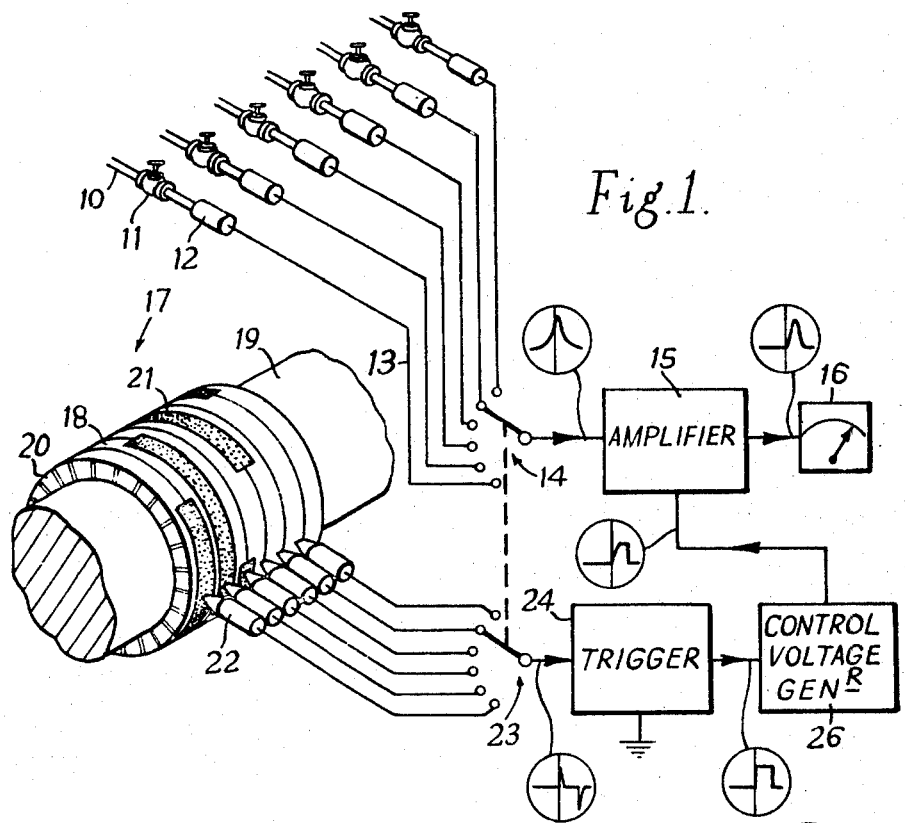
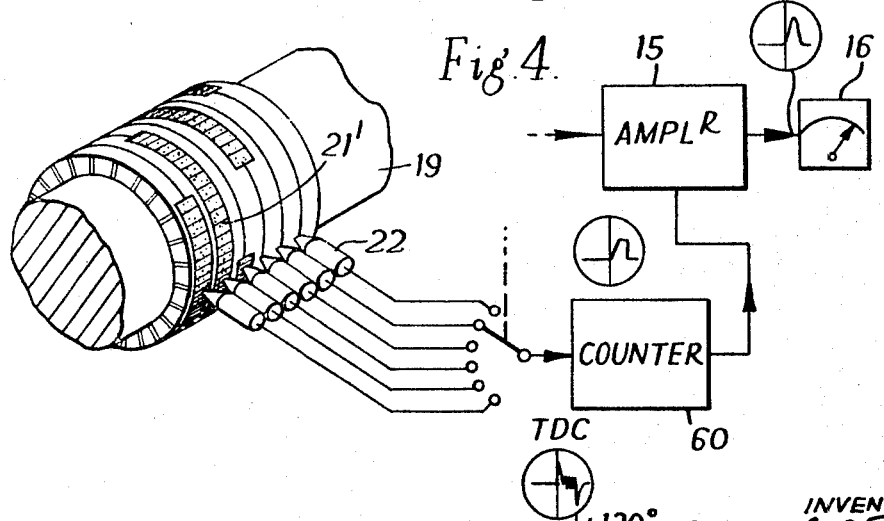

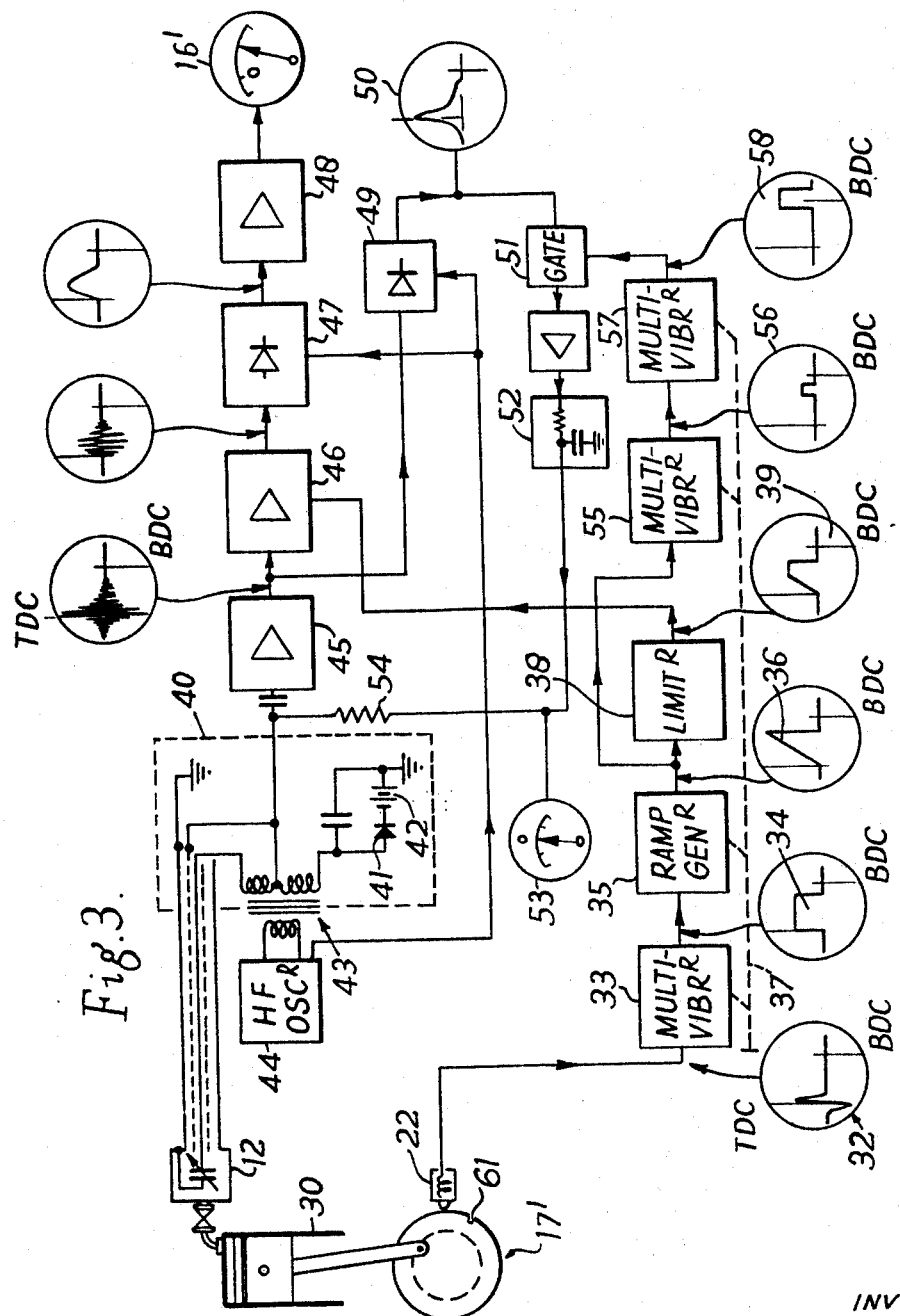

United States Patent Office 3,389,599
Patented June 25, 1968

3,389,599
ENGINE-CYLINDER PRESSURE INDICATORS
Evelyn Stewart Lansdowne Beale, Whitehall,
Wraysbury, Buckinghamshire, England
Filed May 20, 1965, Ser. No. 457,300
Claims priority, application Great Britain, June 1, 1964,
22,605/64
10 Claims. (Cl. 73—115)

ABSTRACT OF THE DISCLOSURE

An engine-cylinder pressure indicator which comprises an indicating meter operated by a voltage produced by multiplying a voltage dependent on the pressure in the cylinder by a signal proportional to piston speed.

---

Figure 2A:
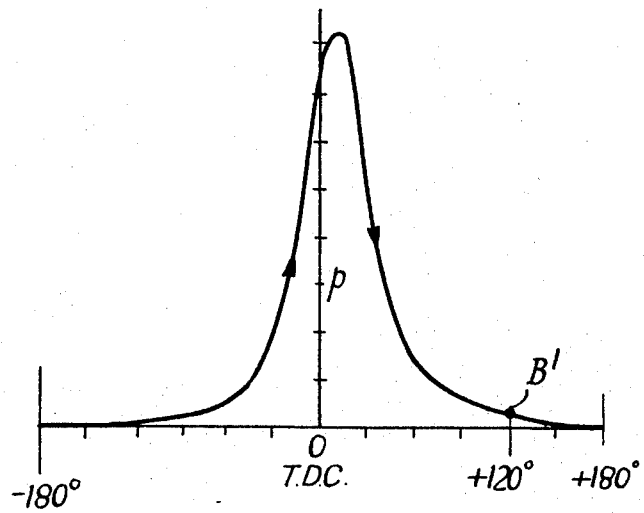

The present invention relates to engine-cylinder pressure indicators.

It is sometimes required to provide a rapid indication of the mean effective pressure (M.E.P.) in an engine cylinder, for example, for balancing the power outputs of the cylinders of a multi-cylinder diesel engine used for ship propulsion, in order to check that all cylinders are delivering their correct power outputs and, if necessary, to equalise the power outputs by adjustment of the fuel-injection system. Using known equipment in which the cylinder pressure diagrams are drawn on recording paper on a stroke base and the work area of the diagram is estimated graphically, the balancing can be effected very accurately if skillfully done but is obviously subject to error in evaluating the indicator cards and it occupies a lot of time of a skilled engineer. This procedure is therefore often not carried out as accurately or as often as would be desirable.

The present invention has for its principal object to provide simple apparatus with which there can be obtained rapidly a sufficiently close approximation to the M.E.P. in an engine cylinder for some purposes, for example, for use in the balancing of power outputs as already mentioned.

The invention is based upon the following considerations. For purposes such as have been mentioned it is not necessary to indicate the true M.E.P. so long as there is given a direct meter reading which is roughly proportional to, or varies in a consistent and repeatable manner with, the M.E.P. In any given installation the meter readings could be calibrated against carefully measured indicator diagrams, either in the maker's works or under suitable test conditions before the beginning of a voyage. Thereafter the indications could be used as a measure of the M.E.P. in each cylinder under similar working conditions on that particular engine.

A very simple way of producing an indication of this kind would be to fit a pressure transducer permanently in each cylinder and to indicate the output from each cylinder in turn, these outputs being integrated with respect to time. However this would simply give the time-mean of the cylinder pressure which would bear a very indirect relation to the mean effective pressure, which is, of course, the mean on a stroke base.

The chief reason why such an arrangement would not be satisfactory is that the high cylinder pressure at and soon after top dead centre (T.D.C.) has a much exaggerated effect if the mean pressure is taken on a time base compared with that on a stroke base. It could therefore give misleading results. Furthermore this simple method would not distinguish between high cylinder pressures occurring before and after T.D.C., whereas they have opposite effects on the M.E.P.

According to the present invention there is provided an engine-cylinder pressure indicator comprising a pressure transducer to be fitted in an engine cylinder and adapted to generate a voltage dependent upon the pressure in the cylinder, a circuit including an amplifier coupling the transducer to an indicating meter, switch means arranged to be operable in dependence upon the rotation of the engine crankshaft to render said circuit operative only between substantially top dead centre and a point in the stroke before bottom dead centre, and means to increase the gain of said circuit during at least the earlier part of the stroke from top dead centre.

The circuit may, for example, be made operative from top dead centre to a crank-angle of 120° after top dead centre. By far the largest part of the work is done during the first part of the power stroke, during which time any change in the combustion conditions will have most effect.

The gain of the circuit may be increased by means of a suitable gain-control voltage applied to the amplifier and this voltage may be arranged to increase the gain linearly from zero at top dead centre for about 40° of crank-angle and thereafter to increase much more slowly or remain constant, for the remainder of the 120° of crank-angle over which the circuit is operative. This change of gain corresponds approximately to the change of velocity of the piston during the power stroke, starting at top dead centre when the velocity is zero. Thus the output of the transducer, which is proportional to the cylinder pressure, multiplied by the gain of the amplifier, which is nearly proportional to the piston velocity, gives an output nearly proportional to the work done by the gas on the piston. Thus the device will give a fairly close approximation of the mean effective pressure plus a constant representing the mean effective compression pressure on the corresponding part of the compression stroke.

With a device according to the invention as so far described, the work of compression is ignored instead of being subtracted from that of the power stroke. However the compression stroke is not appreciably affected by the fuel injection or the combustion, and it may therefore for present purposes be regarded as a constant factor; that is unless something very serious is wrong with the engine, resulting in loss of compression pressure due to leaking valves or piston rings, in which case this would also have an effect on the corresponding out-stroke and would therefore show up on the indicating meter. However this condition would be easily detected in other ways.

The rest of the cycle is also ignored, but its contribution to the M.E.P. is very small and very little affected by fuel injection or combustion. This applies equally to 2-stroke and 4-stroke engines. In the latter case with the T.D.C. switch operating at each revolution for simplicity, the output for the first part of the intake stroke may be included with that for the power stroke, but this would not matter for exactly the same reasons.

It is very desirable for the apparatus fixed to the engine to be as simple and easily fitted as possible, keeping any necessary complications inside the electronic part of the device which can be mounted away from the engine. It is therefore useful to regard the apparatus as made up of two distinct parts:

(1) The electronic circuit and the indicating meter, which is common to all the cylinders of a multi-cylinder engine.

(2) The apparatus fixed to the engine, consisting of the pressure transducers, one in each cylinder (or of course one moved from one cylinder to another) and the T.D.C. switches which must be operated from the crankshaft, so that the instant of switching each transducer is accurately related to the T.D.C. for its particular cylinder.

There are no special requirements for the pressure transducers to be fitted into the cylinders and these can be of any of the well-known types, but to simplify the means for varying the gain of the circuit, transducers designed for operation with a high frequency carrier such as the capacitive or inductive type are to be preferred. Their sensitivities should be equalised and should remain constant. They may be isolated by indicator cocks during normal running, so as to keep them clean and in good condition for the M.E.P. tests, which would normally be of very short duration.

It is important that the "zero" of the transducer shall always be correct during M.E.P. tests, i.e. the output of the transducer and its pre-amplifier should be zero when the cylinder pressure is zero.

As the zero of a pressure transducer is liable to change as its temperature changes a means of observing any change of zero and of correcting it (automatically while measuring the M.E.P. if desired) is preferably provided. This may be done by observing the output from the transducer or its pre-amplifier, i.e. before the variable gain device, for a short period during the engine cycle where it is known that the cylinder pressure is practically atmospheric, e.g. in the region of bottom dead centre. For this purpose an electronic "gate" is opened during this period in every cycle and the mean output used to indicate any departure from zero. The zero can then be corrected, if necessary, either manually, for example by re-balancing a bridge circuit in which the transducer is connected, or automatically by using the mean output amplified as necessary to re-balance the bridge circuit by means of a variable capacitance silicon diode as will be described hereinafter.

Figure 2B:
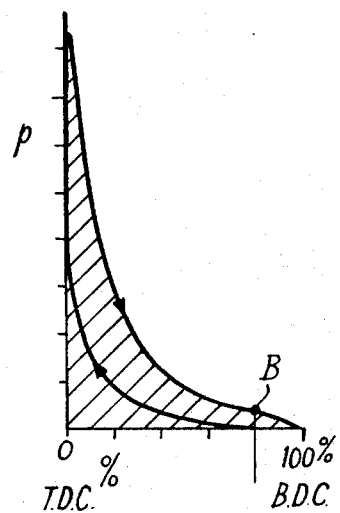
Figure 2C:
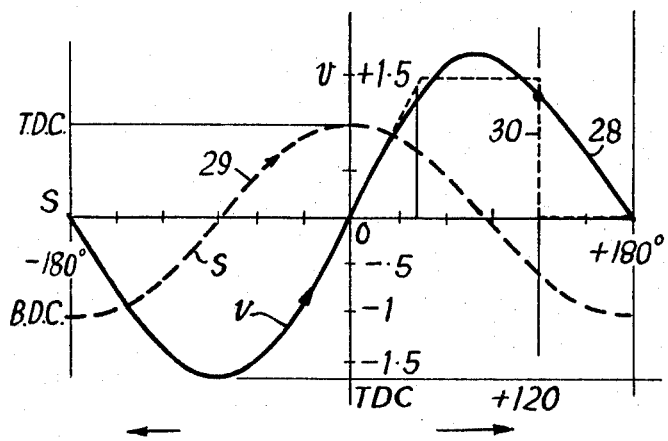
Figure 2D:
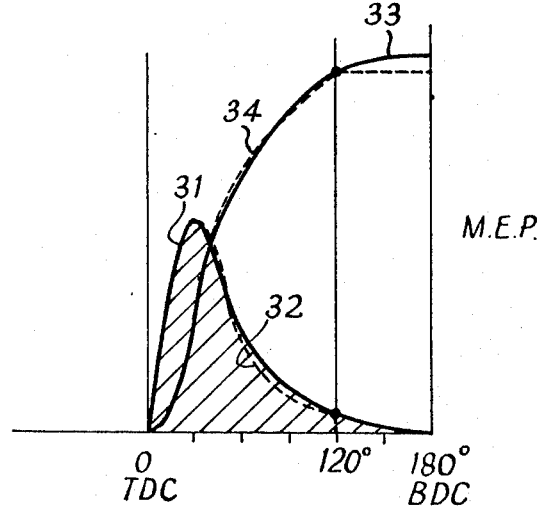

The invention will be described, by way of example, with reference to the accompanying drawings, in which:

FIG. 1 is a diagrammatic representation of one embodiment of the invention,

FIG. 2 (a–d) contains diagrams used in explaining the operation of the invention, FIG. 3 shows a block diagram of the complete circuit of one embodiment including the means for automatically correcting the zero, and FIG. 4 shows a modification of a detail of FIG. 1.

Referring to FIG. 1, each cylinder of a multi-cylinder engine (in this case assumed to be a six-cylinder engine) is connected by a pipe 10 including a cock 11 to a transducer 12. The electrical output of each transducer is connected by a wire 13 to a separate stud on a selector switch 14, the wiper of which is connected to the input of a variable gain amplifier 15. The output of the amplifier is fed to an indicating meter 16. The meter may be a pointer instrument with sufficient inertia to integrate the impulses and give a steady reading, or one with a short period can be used with an integrating or smoothing circuit, for example a suitable combination of resistance and capacitance, in the output of the amplifier 15.

A switching device 17 comprises a strap 18 of non-magnetic material surrounding the engine crankshaft 19. In order to adapt the strap 18 to a range of shaft diameters, it is packed out by means of a series of blocks 20 of a suitable plastics or other material, the strap being tightened down on to the blocks by a simple screw-tensioning device (not shown). The strap 18 carries, over 120° sectors thereof, magnetic material 21, the sectors being staggered around the shaft axis in accordance with the firing order of the corresponding cylinders in such a manner that the leading edge of each strip of magnetic material comes opposite to a pick-up 22 at the position corresponding to top dead centre of the corresponding cylinder.

Each pick-up 22 may be of the electro-magnetic self-generating type and may comprise a short permanent magnet surrounded by a coil, the pole tip of the magnet adjacent the strip of magnetic material being tapered to a blunt chisel edge having its long dimension parallel to the shaft axis. The coils are arranged close to the said pole tips. The pick-ups are mounted on a bracket (not shown) fixed in relation to the engine bed and their pole tips are close to but out of contact with the strips 21. The advantage of such a switching device is that since there is no contact between the pick-ups and the co-operating strips 21 there is no wear.

The coils have one end connected to studs of a second switch 23 the contact arm of which is ganged to that of the switch 14 and is connected to the input of a trigger circuit 24. When the leading edge of a strip 21 comes opposite to its associated pick-up head a pulse, say a positive pulse, is applied to the trigger circuit 24 and when, after 120° of rotation of the switch device 17, the trailing edge of the strip 21 comes opposite to the pick-up head a negative pulse is applied to the trigger circuit. The latter circuit is arranged, in response to these pulses, to generate a square pulse having a duration corresponding to a rotation of 120°. This square pulse is applied to a control voltage generator 26 which may comprise a resistance/capacitance circuit and an amplitude limiter arranged to generate a control voltage which rises steeply over the first part of the pulse from 24, for example, during a time corresponding to 40° of shaft rotation, and then remains substantially constant for the remainder of the duration of the pulse from 24. The resistance/capacitance time-constant circuit of the generator 26 may be discharged at the time corresponding to 120° of shaft rotation under the control of the negative-going pulse from 23 or the negative-going trailing edge of the pulse from 24. The control voltage from 26 is applied as a gain-control voltage to the amplifier 15, for example to a variable-mu valve in the amplifier. The gain of the amplifier is arranged to be zero or very low initially and the control voltage serves to increase the gain to a suitable value during a time corresponding to 40° of shaft rotation and to maintain the gain substantially constant at the higher value for the next 80° of shaft rotation. At the end of the square trigger pulse at 120° the control voltage drops to zero thereby reducing the gain of the amplifier to zero, in effect switching off the transducer for the rest of the crank-shaft revolution. The waveform of this control voltage in combination with the characteristics of the gain control device is chosen to make the change of gain represent the change of piston velocity as well as possible over the chosen part of the power stroke starting at T.D.C.

Referring now to FIG. 2, at $a$ is a diagram of engine cylinder pressure $p$ plotted against crank-angle (which corresponds to time). At $b$ is shown the same pressure plotted against stroke. The M.E.P. is represented by the area enclosed between the two curved lines in diagram $b$. The apparatus shown in FIG. 1 serves to measure the cross-hatched area from T.D.C. to a point B at approximately 80% of the stroke from T.D.C. The corresponding point B' is marked in diagram $a$ at 120°. It will be noted that the hatched area to the right of B in diagram $b$ is very small in relation to the remainder of the hatched area. It will also be appreciated that in normal circumstances little error is introduced by regarding the area below the lower curve (representing the compression stroke) as constant.

The full line curve 28 in diagram $c$ shows the ratio $v$ of the instantaneous piston velocity $u$ to the mean piston velocity $u$ mean plotted against crank angle on the assumption of a ratio of connecting rod to crank of 4:1.

The dashed curve 29 represents the corresponding diagram of the stroke S plotted against time (or crank angle). The dotted curve 30 shows the amplifier gain, varied in the manner described, starting at zero at T.D.C., rising linearly to a constant value at 40° after T.D.C. which is maintained till 120° when it drops to zero again, corresponding to the transducer being switched off.

The curves of diagram $d$ are derived from those of diagrams $a$ and $c$, and are all plotted against crank angle (or time). The full line curve 31 shows the value of $p \times v$ which represents the rate at which work is done by the gas on the piston, so that this may be regarded as a curve of p.s.i. of M.E.P. per degree of crank angle. Thus the cross-hatched area under this curve represents the work done on the piston after T.D.C. which can be expressed as an M.E.P. as usual. The dotted curve 32 represents the product $p \times A$, where A is the gain, for the apparatus of FIG. 1.

The full line curve 33 represents the integral of the curve 31 with respect to time and the ordinate at any point of this curve represents the area under the curve 31 from T.D.C. up to that point. The dotted curve 34 is similarly the integral of the curve 32 with respect to time. The value of M.E.P. given by this curve includes that during the compression stroke which, as already explined, can be regarded as approximately constant and must be substracted from the total M.E.P. in order to give the net M.E.P. This subtraction can be carried out by suitable calibration or by suitable biasing of the meter 16.

Many changes can be made in the apparatus described with reference to FIG. 1 within the scope of the present invention. For instance the switching device 17 can take many different forms such as cam-operated switches, or brushes co-operating with conducting segments of a commutator.

In the arrangement described with reference to FIG. 1, the duration of the pulse applied to the control voltage generator 26 is determined by the engine speed and is constant in terms of crank-angle, but the time taken for the gain to increase from zero to a maximum is determined by a "time-constant" circuit, and the time constant must therefore be adjusted so as to correspond to the same crank-angle to suit different engine speeds. It is therefore independent of engine speed.

Alternatively the member driven by the crankshaft may be arranged only to initiate the effective closure of a switch. For instance it may generate a single short pulse at T.D.C., which simplifies the attachments to the engine shaft. This pulse may be applied, for example to a multivibrator to generate a square pulse of the desired predetermined duration. The duration of the square pulse should then be made adjustable (if desired manually, but preferably automatically) with change in engine speed in such a manner that the duration always corresponds to the same crank-angle.

In FIG. 3 there is shown a transducer 12 coupled to an engine cylinder 30. The switching device 17' differs from that in FIG. 1 in that a single small magnetic discontinuity 61 is provided for each cylinder. In the electromagnetic pick-up 22, therefor, a pair of pulses close together, such as shown at 32, is generated at each rotation of the switch device 17'. The positive-going pulse only is used to trigger a multivibrator 33 which generates a square pulse 34 which is fed to a ramp waveform generator 35 generating a waveform having a ramp portion 36 whose slope is determined by the time constant of a circuit within the generator 35 and which commences at the beginning of the square pulse 34, followed by a return to zero at the end of the square pulse 34. A ganged control 37 is provided for varying the triggering time of the multivibrator 33, and hence the duration of the square pulse 34, and the time constant of the ramp generator 35, and hence the slope of the ramp portion 36. A limiter 38 then produces a gain-control voltage 39 of the same waveform as in FIG. 1.

In this example the capacitive-type pressure transducer 12 is arranged to form one arm of a Blumlein bridge 40 having a second capacitive arm including a variable capacitance diode 41 in series with a bias source 42. The inductive arms of the bridge are formed by the centre-tapped secondary winding of a transformer 43 having a high frequency oscillator 44 coupled to its primary winding.

A voltage proportional to cylinder pressure is fed to a high frequency amplifier 45, a variable gain high frequency amplifier 46, a phase-sensitive rectifier 47 fed with a reference signal from the oscillator 44, a D.C. amplifier 48 and a meter 16', which may be a moving coil voltmeter of long period. The gain-control voltage 39 is applied to control the gain of the amplifier 46.

For the purpose of zero correction a signal representing the pressure-time diagram of the engine cylinder 30 is made available by rectifying, by means of a phase-sensitive rectifier 49 supplied with the reference signal from 44, the high frequency signal at the output of the H.F. amplifier 45, i.e. before the variable gain amplifier 46. This rectified signal may incidentally be applied to an oscilloscope 50 as a monitor if required.

This signal is then passed through a gate 51 which is opened for a short interval in each engine cycle when the cylinder pressure is known to be nearly zero, i.e. atmospheric. In a 2-stroke engine, for example, this interval is near bottom dead centre.

The mean value of the signal passed through the gate 51 should then be zero; but if it is not, the zero error signal, after amplification and smoothing by an R-C circuit 52 with a time-constant of about 50 engine cycles, is applied as a zero-correcting voltage to a monitoring voltmeter 53. The balance of the transducer bridge can then be re-adjusted manually to reduce the reading on the voltmeter 53 to zero.

The zero-correcting bias voltage is also fed through a high resistance 54 (to avoid loss of high frequency signal) to the junction of the two inductive ratio arms of the bridge 40, so as to alter the D.C. bias on the variable capacitance diode 41 in such a way as to re-balance the bridge and reduce the zero error signal to a negligible value.

A square-topped pulse for opening the gate 51 for a short time near B.D.C. is generated as follows. The waveform 36 is fed to a circuit 55 including a monostable multivibrator. The circuit 55 generates from the trailing edge of the waveform 36 and delays by a suitable amount a pulse 56 which is fed to a gating waveform generator 57, which may be a monostable multivibrator, generating a gating waveform 58 which is fed to the gate 51.

The delay and the duration of the gating pulse 58 are determined by the time-constants in the two monostable multivibrator circuits in 55 and 57 respectively. These time-constants should therefore be so adjusted as to give the required intervals in terms of crank-angle to suit the speed of the engine. However exactly the same thing applies to these as to the multivibrator 33 and the ramp waveform generator 35 for the gain control voltage, and the time-constants of the circuits 55 and 57 may be adjusted by means of the same ganged control 37.

As an alternative to the arrangements described, in which the gain control voltage is essentially a function of time, it can be made a direct function of crank-angle so that it will always reach its limiting value at 40° regardless of engine speed. One way of doing this, indicated in FIG. 4, is to provide on the crankshaft 19 for each cylinder a serrated member 21' replacing the material 21 of FIG. 1 and also extending over 120°. Each member may be in the form of a corrugated or wholly or partly interrupted strip of magnetic material surrounding the shaft, cooperating with a pick-up 22 which will then give one impulse as each serration passes it, say one every one or two degrees of crank angle. These pulses are fed to a suitable counter circuit 60 which generates a control voltage arranged to increase in a series of small steps, reaching its limiting value at a pulse count corresponding to 40° then remaining constant until it dropped to zero at 120°. This control voltage is applied to control the gain of the amplifier 15 in FIG. 1. With this arrangement the gain need not increase linearly but can be made to follow any desired law by suitably spacing the serrations.

The indications given by the meter 16 in FIG. 1 can be made to represent the true M.E.P. more closely by subtracting the M.E.P. during the compression stroke. This may be done by making the gain of the amplifier negative (that is effecting a phase reversal) during the compression stroke and varying it with crank-angle in a manner similar to that employed during the power stroke.

Thus control voltage generator 26 may be arranged to generate a gain-control waveform such that the amplifier is switched on to full negative gain at −120° from T.D.C., this gain being maintained until −40° when an impulse from the switch would start reducing the gain until it reached zero again at T.D.C. Thereafter the gain would be varied in exactly the same way as previously described, that is increasing to full positive gain at +40° and then remaining constant at full gain till 120° when the amplifier would be switched off or the gain reduced to zero. In this way the M.E.P. during the compression stroke would be subtracted from the M.E.P. during the power stroke, giving the net M.E.P. as normally required.

One of the preferred means for varying the gain by a D.C. control voltage is to use a carrier type of amplifier, for example as shown in FIG. 3, using a relatively high frequency carrier, such as 100 kc./s. or higher, and to vary the gain by the use of a variable-mu valve in the amplifier 46 in the usual way.

The preferred method of controlling the gain of the amplifier 46 is, however an adaptation of a circuit disclosed in an article by K. C. Johnson, entitled "Wide Range Transistor Wobbulator," published in Wireless World, February 1965, pages 99 and 100. It involves the use of a pair of valves driven by their cathodes or a pair of transistors driven by their emitters, the driver being a valve or transistor arranged as a constant-current, or high impedance device in the common "tail" of the pair. The current in the "tail" is controlled by the signal voltage applied to this device. The circuit used in carrying out the present invention differs from that disclosed in the Johnson article only in minor respects; thus in the Johnson circuit the gain of only one of the pair of transistors is made use of and the change of gain is used to change the effective reactance of an inductor in its collector circuit, thereby changing the frequency of the oscillatory circuit coupled to it. In the application to the present invention the circuit is used as a straightforward amplifier and the output from both collectors of the pair is used in push-pull instead of using the output from only one of the collectors. In the circuit according to the present invention, the fraction of the current in the tail passing through each of the pair is determined by the relative bias applied to each grid or bas. This can be varied by applying the gain control voltage to one of them, keeping the bias of the other one of the pair constant. When the two biases are equal the output signals at the anodes or collectors are equal, so the net output, i.e. the difference between the two outputs in phase with each other, taken in the form of a push-pull output, is zero.

Thus the net output and therefore the gain can be controlled in a linear manner down to zero by the gain control voltage, and it can be made negative, i.e. reversed in phase, if required.

An advantage of this arrangement is that the means used for varying the gain will not vary the "zero" of the indicating system, i.e. the output from the amplifier will remain at zero for zero signal input regarless of the gain setting.

Although reference has been made herein to the indication of the M.E.P. of internal-combustion engines, the invention can be applied to other engines having reciprocating pistons, e.g. compressors.

What is claimed is:

1. An engine-cylinder pressure indicator comprising a pressure transducer to be fitted in an engine cylinder and adapted to generate a voltage dependent upon the pressure in the cylinder, means for generating a signal proportional to the piston speed of said engine, an indicating meter, a circuit coupling said transducer to said meter, said circuit including means for approximately multiplying said voltage and said signal, and switch means for operation by the crankshaft of said engine in dependence upon the rotation of said crankshaft, said switch means being connected in said circuit to render said circuit operative only between substantially top dead centre and a point in the stroke before bottom dead centre.

2. An engine-cylinder pressure indicator according to claim 1, wherein said multiplying means comprise an amplifier in said circuit and means responsive to said signal to increase the gain of said amplifier during at least the earlier part of the stroke from top dead centre.

3. An indicator according to claim 2, wherein said gain-increasing means are arranged to increase the gain substantially linearly over said earlier part of the stroke from top dead centre and thereafter to maintain the gain substantially constant over a further part of the stroke.

4. An indicator according to claim 2, wherein said circuit comprises time-constant means for determining the duration of said gain increase and means for varying said time constant whereby said time constant can be adapted for different engine speeds.

5. An indicator according to claim 2, comprising means responsive to changes in engine speed to actuate said gain-increasing means.

6. An indicator according to claim 2, wherein said circuit comprises time-constant means for determining the rate of said gain increase and means for varying said time constant whereby said time constant can be adapted for different engine speeds.

7. An indicator according to claim 1, comprising means for deriving from said transducer a zero-determining voltage dependent on the cylinder pressure at a point in the stroke at which the cylinder pressure is substantially atmospheric, this zero-determining voltage permitting the adjustment of the zero of the indicating meter.

8. An indicator according to claim 7, comprising means for applying said zero-determining voltage to effect automatically a correction of the zero of the indicating meter.

9. An engine-cylinder pressure indicator comprising a pressure transducer to be fitted in an engine cylinder and adapted to generate a voltage dependent upon the pressure in the cylinder, means for generating a signal having a duration inversely proportional to the piston speed of said engine, an indicating meter, and a circuit coupling said transducer to said meter, said circuit including means for approximately multiplying said voltage and said signal.

10. The combination defined by claim 9 in which said circuit coupling said transducer to said meter comprises an amplifier and which further includes means to apply said signals to said amplifier to increase the gain thereof.

References Cited

UNITED STATES PATENTS

| | | | |
|---|---|---|---|
| 896,755 | 10/1908 | Picht | 73—115 |
| 1,355,661 | 10/1920 | Frisch | 73—115 |
| 2,349,560 | 5/1944 | Reijnst | 73—115 |
| 2,497,883 | 2/1950 | Harris | 330—147 X |

FOREIGN PATENTS

| | | |
|---|---|---|
| 693,950 | 7/1953 | Great Britain. |

RICHARD C. QUEISSER, *Primary Examiner.*

J. W. MYRACLE, *Assistant Examiner.*